March 1, 1938.    G. A. LYON    2,109,672
TIRE COVER ASSEMBLY
Original Filed Nov. 1, 1933
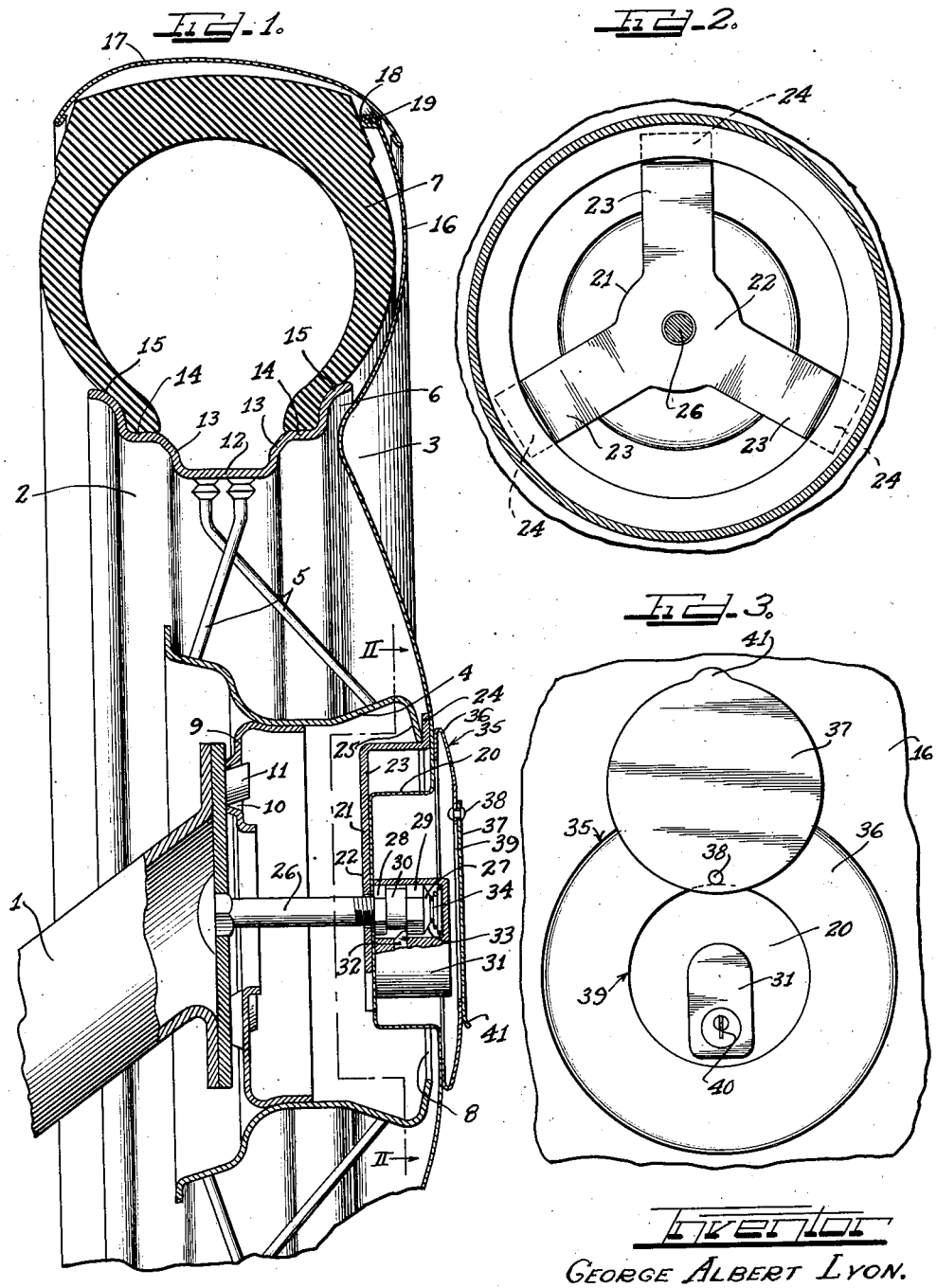
Inventor
GEORGE ALBERT LYON.
by
Attys.

Patented Mar. 1, 1938

2,109,672

UNITED STATES PATENT OFFICE 2,109,672

TIRE COVER ASSEMBLY

George Albert Lyon, Allenhurst, N. J., assignor to Lyon, Incorporated, Detroit, Mich., a corporation of Delaware Original application November 1, 1933, Serial No. 696,224. Divided and this application June 27, 1936, Serial No. 87,623

1 Claim. (Cl. 150—54)

This invention relates to spare wheel assemblies, and more particularly to means for mounting a spare wheel on a carrier, to an ornamental cover for disposition over a wheel, and to an ornamental cover and wheel locking means.

This application is a division of my co-pending application entitled "Spare wheel and cover assembly", filed November 1, 1933, Serial No. 696,224.

It is an object of my invention to provide a new and novel spare wheel assembly which is economical to manufacture and reliable in use.

It is a further object of my invention to provide a novel form of ornamental cover for a spare wheel assembly which is reinforced by a stiffening member to relieve mounting stresses in the cover.

It is a still further object of my invention to provide a novel form of locking mechanism for spare wheel assemblies.

Another object of my invention is to provide a novel form of spare wheel assembly in which the cover and spare wheel are held in proper cooperative relation with each other and with the carrier.

A further object of the invention contemplates the provision of means affording a single connection between the cover and the carrier, whereby all of the parts are held in proper cooperative relationship with respect to each other, together with instrumentalities independent of the connection for preventing unauthorized access to the connection.

The novel features which I believe to be characteristic of my invention are set forth with particularity in the appended claims. My invention itself, however, both as to its organization and manner of construction, together with further objects and advantages thereof, may best be understood by reference to the following description taken in connection with the accompanying drawing, in which:

Figure 1 is an elevational view, partly in cross-section, illustrating one embodiment of my invention;

Figure 2 is a fragmentary sectional view taken substantially as indicated by the line II—II of Figure 1; and Figure 3 is a fragmentary front elevation of the central portion of the structure of the cover shown in Figure 1.

As shown on the drawing:

Referring to Figure 1, the wheel assembly illustrated comprises a spare wheel carrier 1 of the type which is commonly provided on automotive vehicles for carrying an extra or spare wheel, a wheel 2 mounted on the carrier 1, and a two-piece ornamental spare wheel cover 3. The wheel 2 is of the drop-center rim type and includes a hub 4, a plurality of spokes 5, a rim part 6 and a tire 7. The wheel structure may of course be varied within wide limits without departing from the scope of my invention, as will readily be understood from a careful analysis of the ensuing paragraphs.

The hub 4 of the wheel 2 has a relatively large opening 8 at its outer end and is provided with an integral fastening flange 9 near its inner end. The fastening flange 9 has an annular series of apertures 10 through which a plurality of upwardly inclined supporting pins 11 are adapted to extend, thereby to support the wheel 2 in its desired position on the carrier 1. The annular series of apertures 10 are also adapted to receive the usual brake drum fastening bolts when the wheel is assembled on a vehicle axle in its operative position. As is known to the art, it is not usually necessary to use as many supporting pins to mount the spare wheel 2 on the spare wheel carrier 1 as is used to secure a wheel to the vehicle axle, and hence it will be understood that the carrier 1 may be provided with a fewer number of supporting pins 11 than there are apertures in the fastening flange 9.

The rim 6 is of a drop-center type and includes a base flange 12, opposite side flanges 13, opposite intermediate flanges 14, and opposite edge portions 15. The base flange 12 of the rim 6 is secured to the hub 4 by means of a plurality of spokes 5 which are secured to the rim and hub in a manner well-known in the art. The tire 7 is seated on the intermediate flanges 14 of the rim 6 in the usual manner.

The two-piece ornamental spare wheel cover 3 includes a side plate 16 and a resilient split ring 17. The side plate 16 and ring 17 are composed of sheet material, preferably metal, and they may assume any desired configuration which is pleasing to the eye and which will enhance the general beauty of the vehicle upon which the wheel is mounted. In order to eliminate noise in the cover assembly, caused by a metal to metal contact between the two cover pieces, the outer marginal edge 18 of the side plate 16 is outwardly curled to carry a cushioning bead 19 upon which the ring 17 rests. The bead 19 is composed of soft rubber or other material having similar cushioning properties.

The central portion of the side plate 16 is provided with a rearwardly extending boss 20 which may be of a diameter appreciably less than the diameter of the opening 8 in the outer end of the hub 4, so as to clearly fit therein. For the purposes of reinforcing the face of the boss 20 as well as to assist in holding the cover 3 in substantially coaxial relation to the spare wheel 2, a stiffening member or spider 21 is provided comprising a body 22 and arms 23. The number of arms 23 may of course be varied, three being herein employed for illustrative purposes only. The body 22 and arms 23 adjacent the body extend substantially at right angles to the axis of the boss and rearwardly of the same, and are brazed, welded, riveted or otherwise suitably, and preferably permanently, connected to the base of the boss 20. The arms are bent forwardly so as to extend substantially parallel to the axis of the boss 20 adjacent their outer ends, and at such a distance from the center of the body 22 as to enable the arms to snugly fit into the opening 8 of the hub 4. It will, of course, be understood that suitable clearance will be allowed to compensate for slight discrepancies in manufacture, and to enable the spider to readily fit without difficulty into the opening 8. The arms 23 at their outer extremities 24 extend laterally so as to be interposed between the side plate 16 and the front wall 25 of the hub 4. The outer extremities 24 of the arms 23 are welded or otherwise suitably secured to the inner surface of the side plate 16.

The boss 20 and spider body 22 are provided with registering central openings through which the shank of a bolt 26 mounted on the carrier 1 extends, the end of the bolt 26 being threaded to receive a nut 27 having a construction as shown in the drawing. The nut 27 is provided with spaced wrench engaging portions 28 and 29 and an intermediate annular groove 30 for cooperation with a locking mechanism which will presently be described.

A bolt lock device 31 is provided which affords a housing for the head of the bolt 26 and is designed with sufficient clearance to enable the housing to be rotated about the bolt head. The lock device 31 is provided with a key-controlled latch or plunger 32 which has its rear outer end beveled so as to be cammed outwardly by the beveled forward extremity 33 of the bolt head of the lock device 31 and forced rearwardly over the bolt head. A spring 34 mounted in the forward end of the housing is arranged to yieldably resist telescoping movement of the lock device 31 relative to the bolt head and to yieldably hold the latch 32 in engagement with the front lateral wall of the circumferential groove 30 after said latch has been snapped by the lock mechanism into said groove to the position shown in Figure 1. The lock 31 may, of course, be varied in its details so long as it performs the function described. By inserting the proper key in the device 31, the latch 32 may be retracted sufficiently to enable the device 31 to be removed, thus permitting the application of a wrench to the nut 27.

Once the nut 27 is tightened to the desired degree, it is clear that rattling will be prevented, and at the same time the spare wheel, spare tire and ornamental cover will be securely held in proper cooperative relationship. When the locking device 31 is applied, the entire wheel assembly, including the spare wheel, the spare tire and the ornamental cover, are securely locked to the carrier.

A cap structure for protecting the instrumentalities located in the boss 20 from theft and the like may be provided, as shown at 35. This structure embodies a hollow member 36 having an inturned marginal edge which may be spot welded, riveted or otherwise suitably secured to the side plate 16 in substantially coaxial relation thereto. A closure 37 is hinged to the part 36 at 38 so as to swing, the part 36 being provided with a central opening 39 rendering the interior of the boss 20 accessible for the application of a key to the keyhole 40 of the lock device 31, and the application of a wrench to the portions 28 and 29 of the nut 27. The closure 37 may be swung into closed position, as shown in Figure 1, or to open position, as shown in Figure 3, and to facilitate engagement therewith for moving the same, the closure is provided with a finger grip or tab 41.

While I have shown a particular embodiment of my invention, it will of course be understood that I do not wish to be limited thereto, since many modifications may be made, and I therefore contemplate by the appended claim to cover all said modifications that fall within the true spirit and scope of my invention.

I claim as my invention:

A wheel and rigid cover assembly comprising a support for carrying a spare tire wheel and having a depressed central hub, a front cover member covering substantially all of the face portion of the tire and wheel assembly and having a central opening and inwardly extending concealed supporting means at said opening, and fastening means accessible through said opening and cooperating with said wheel support and cover supporting means for securing the wheel and front cover member in position, and means normally filling said opening and removable to permit access to said fastening means, said concealed supporting means including a central clamp connected to and projecting away from the rear of said cover member and into the interior of said depressed central hub wherein it is secured to said assembly by said fastening means, said central opening in said cover member being defined by a depressed cup in which said fastening means is disposed, and said clamp extending from said cover about the rear of said cup and having an upper arm for engaging the wheel hub to center and clamp the hub on said support.

GEORGE ALBERT LYON.